E. GRUENFELDT.
SYSTEM OF ELECTRICAL CONTROL FOR MOTOR VEHICLES.
APPLICATION FILED JAN. 23, 1908.
913,283.
Patented Feb. 23, 1909.
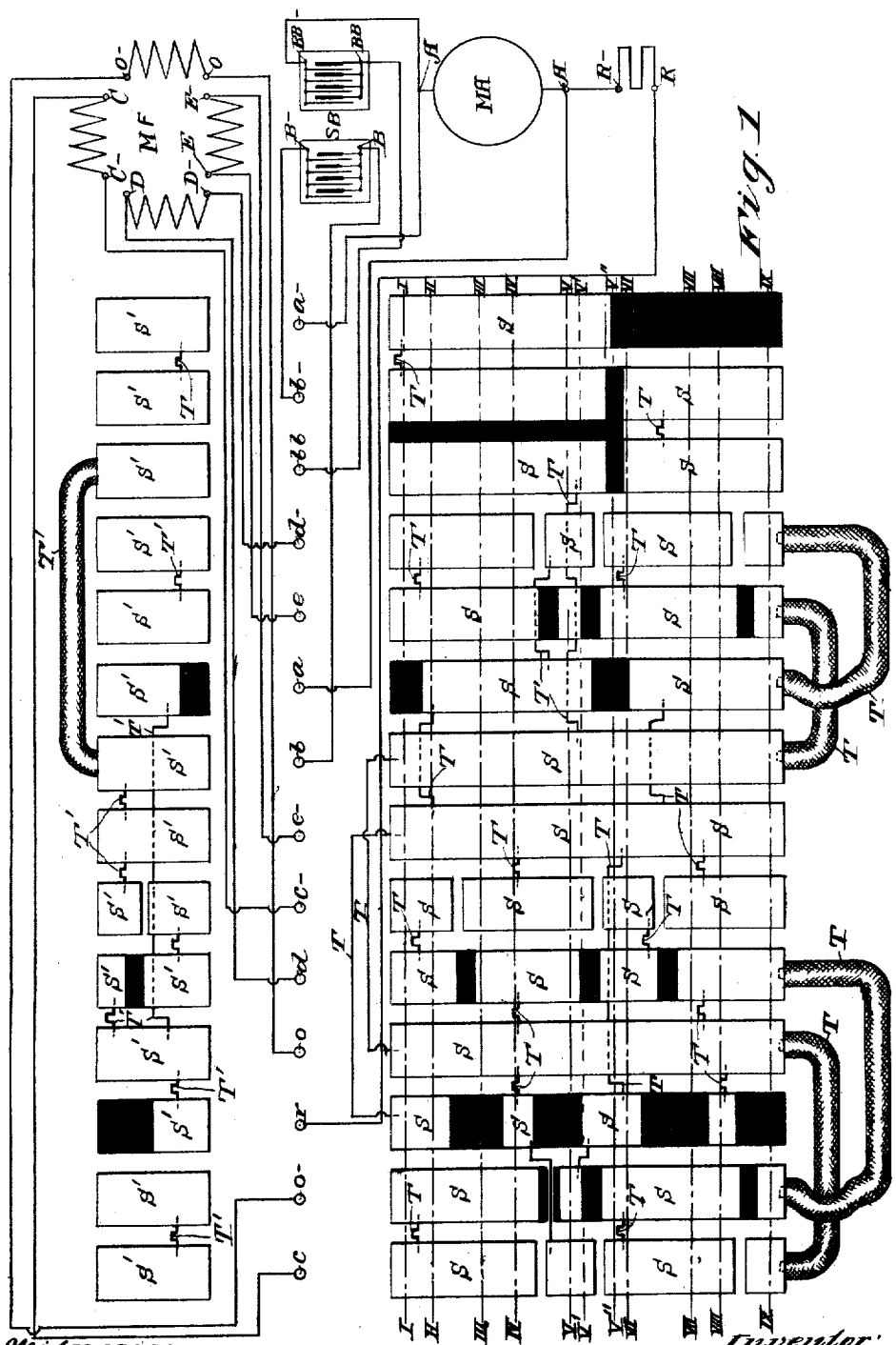

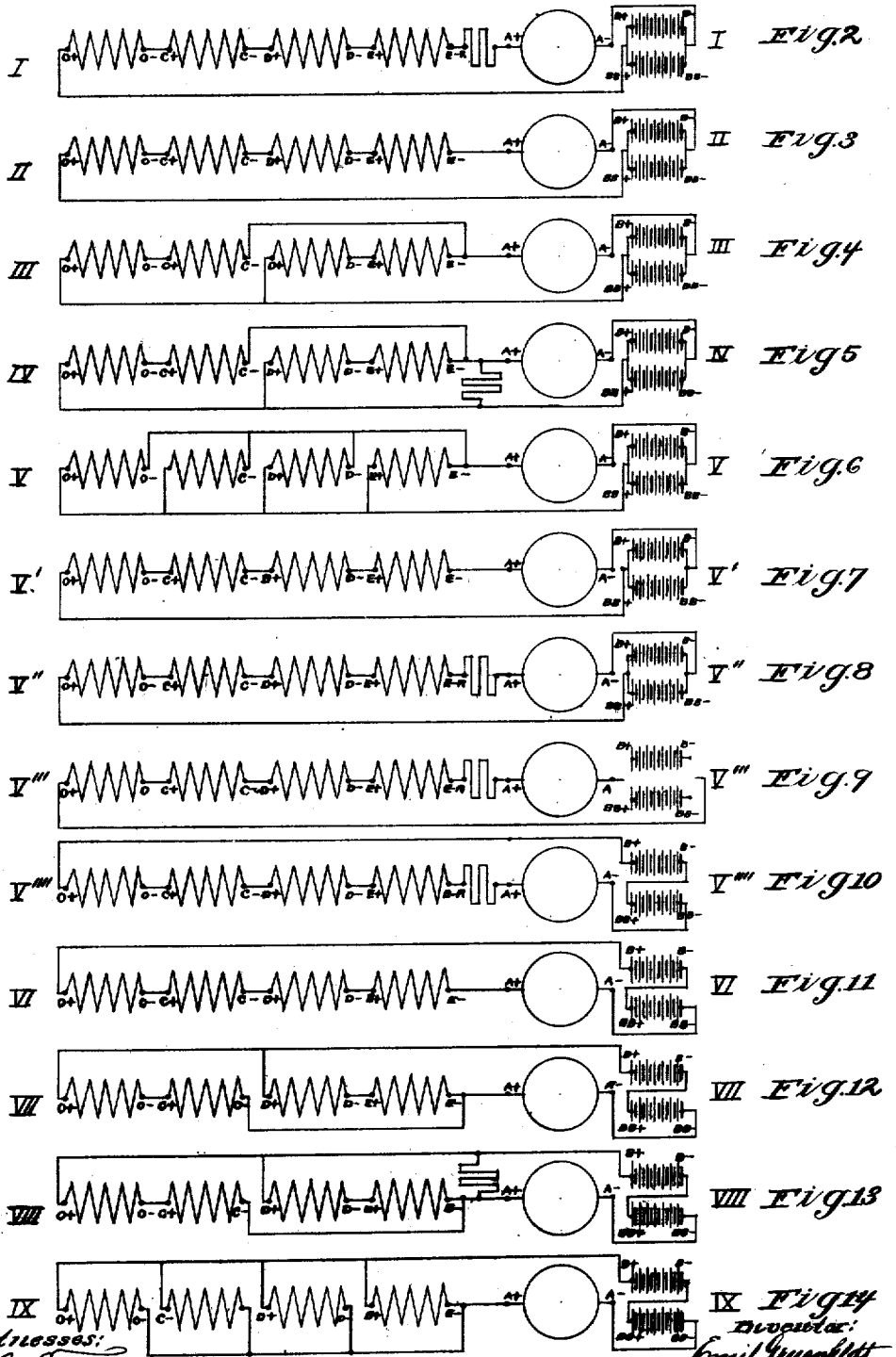

E. GRUENFELDT.
SYSTEM OF ELECTRICAL CONTROL FOR MOTOR VEHICLES.
APPLICATION FILED JAN. 23, 1908.

Witnesses:
J. C. Turner
Lena A. Dirlam

Inventor:
Emil Gruenfeldt
by
A. Merkel.
Attorney

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

SYSTEM OF ELECTRICAL CONTROL FOR MOTOR-VEHICLES.

No. 913,283.      Specification of Letters Patent.      Patented Feb. 23, 1909.

Application filed January 23, 1908. Serial No. 412,236.

*To all whom it may concern:*

Be it known that I, EMIL GRUENFELDT, a subject of the Emperor of Germany, resident of Cleveland, county of Cuyahoga, and State of Ohio, have invented a new and useful Improvement in Systems of Electrical Control for Motor-Vehicles, of which the following is a specification, the principle of the invention being herein explained and the best mode in which I have contemplated applying that principle, so as to distinguish it from other inventions.

My invention relates to systems of electrical control as especially applied to motor vehicles including series wound motors wherein the source of power is derived from the storage batteries, the object of such invention being to provide a system of such control wherein the voltage may be changed from a given tension to a comparatively high tension in an economical and efficient manner practically without sparking.

A further object of the invention is to effect connections of the various elements of the system in a manner such that the motor may be caused to operate at various speeds.

The said invention consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

Figure 15:
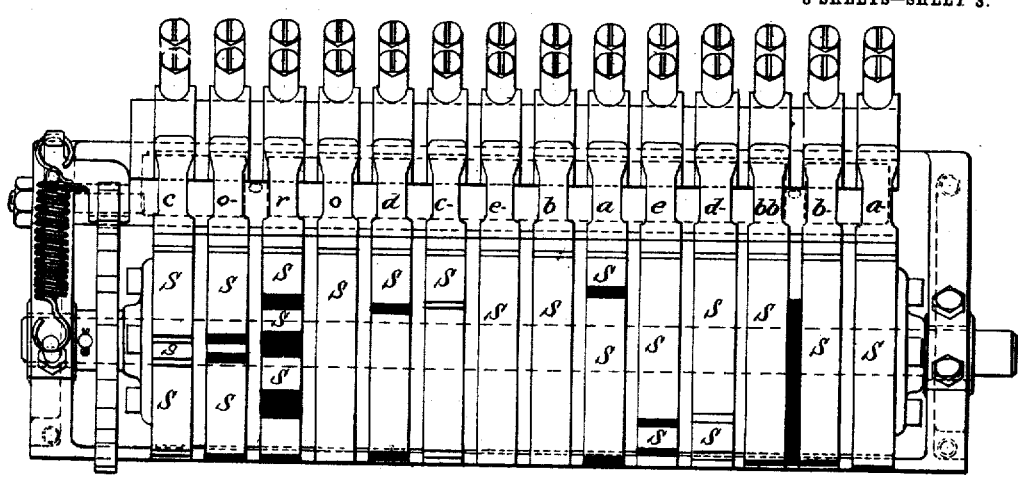
Figure 16:
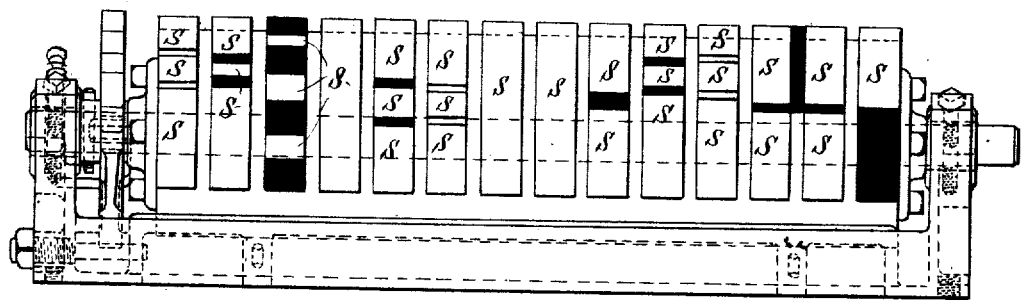
Figure 17:
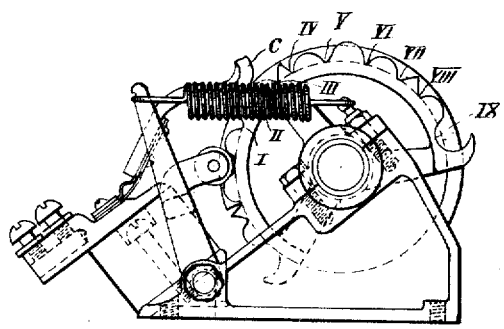

In said annexed drawings:—Figure 1 represents a development of a controller and a diagrammatic view of the motor and battery connections embodying my invention. Figs. 2 to 14 inclusive illustrate diagrammatically the connections between the batteries, motor, resistance and field windings for the various punctuated and intermediate positions which are occupied by the controller throughout its range of operation for effecting the different forward speeds. Fig. 15 is a plan of a controller constructed in accordance with my invention and Figs. 16 and 17 are an elevation and an end view respectively, of such controller.

Referring to Fig. 1, S S represents the controller segments which are mounted upon a suitable insulating cylinder in the usual manner and connected with each other by means of conductors T T in the manner indicated. These segments S are those which are used in making the connections for the forward speeds. The segments S' at the upper portion of the figure are those which are utilized in making the connections for the reverse speeds and are suitably connected with each other by means of conductors T' in the manner indicated. SB represents a storage battery divided into two sections, MA the armature of the motor and MF the field winding of the latter. As illustrated, the field winding of the motor is divided into four sections, the terminals of which are connected as shown. In this diagrammatic view the locations of the contact fingers of the controller with reference to each other and with reference to the segments of the controller when the latter is in its "off" position, are represented by $c$, $o^-$, $r$, $o$, $d$, $c^-$, $e^-$, $b$, $a$, $e$, $d^-$, $b\,b$, $b^-$, and $a^-$. The fingers $c$ and $c^-$ are connected with the positive and negative terminals C and C⁻ of one of the field winding divisions, as shown. Fingers $d$ and $d^-$ are similarly connected with the positive and negative terminals respectively of another such division. Fingers $e$ and $e^-$ are similarly connected with the positive and negative terminals E E⁻ respectively of a third division, and fingers $o$ and $o^-$ are similarly connected with the positive and negative terminals O and O⁻ of the fourth division of the field winding. Finger $a$ is connected, as shown, with the positive terminal of the armature, and finger $r$ is connected with one terminal R of a non-inductive resistance, the other terminal R⁻ of which is connected with the positive terminal of the armature as shown. Finger $b$ is connected with the positive terminal B of one of the battery sections and finger $b^-$ is connected with the negative terminal B⁻ of same. Finger $b\,b$ is connected with the positive terminal B B of the other battery section, the negative terminal of such section being connected with the armature as shown. The controller is arranged to punctuate the positions indicated by lines I—I, II—II, III—III, IV—IV, V—V, VI—VI, VII—VII, VIII—VIII, and IX—IX, by any suitable means such as the usual star-wheel mechanism.

It will be assumed that the battery sections are of equal capacity and that when connected in parallel they will produce 40 volts and when in series, 80 volts. Let it now be assumed that the controller is moved so as to bring the contact fingers $c$, $a$—, etc. with reference to the segments of the controller, into the position indicated by line I—I. In this position the connections are those illustrated in Fig. 2, and it will be noted that the field winding sections are in series with the resistance and that the battery sections are in parallel. Therefore we have the highest resistance which the circuit can present and the lowest voltage, thereby obtaining the lowest speed of the motor. Let it now be assumed that the next step of the controller will bring the fingers upon the line II—II. In this position the connections are those illustrated in Fig. 3, and it will be noted that the resistance has been cut out of the circuit, but that otherwise the connections remain as in the position described in the first or lowest speed. The segments are so arranged that the next step of the controller will bring the fingers upon the line III—III. In this position the field sections are connected in series parallel as illustrated in Fig. 4, the remaining connections remaining as described when the motor is on 2d speed. This last named position gives a 3d speed higher than the 2d. On the 4th speed, the connections are as described in connection with the 3d speed with the exception that the resistance is shunted so as to increase the amount of current passing directly from the battery to the armature as shown in Fig. 5. Such arrangement gives us the 4th and an increased speed, the position of the fingers being indicated by line IV—IV. When the controller is next shifted so as to bring the fingers upon the line V—V, the connections are such as to cut out the resistance and arrange the field sections in parallel, the other connections remaining as in speed 3, as shown in Fig. 4.

The position of the fingers with reference to the controller segments for the 6th speed are indicated by line VI—VI in which it will be noted that the connections are such as to place the field windings in series and the batteries also in series as diagrammatically shown in Fig. 11, in which position the batteries give a current of 80 volts. Before the fingers reach the position in which the voltage is changed from low to high, they assume a series of intermediate positions, the connections for which are diagrammatically illustrated in Figs. 7, 8, 9 and 10 and which I shall now describe. When the fingers reach the position indicated by line V'—V', it will be noted, Fig. 1 that the segment $S^2$ is engaged by finger $r$. Immediately thereafter the initial steps in changing the field connections from parallel to the series relation as shown in Fig. 7, take place, the entire current being sent through one field section at one period in the change and before the completion of such connections so as not to create a break in the circuit. A further movement now breaks the connection with the armature segment, thereby placing the resistance in the circuit. By the time the fingers reach the position indicated by line V"—V" the field sections are connected in series as shown in said Fig. 7 and the resistance is also in series with such sections, as illustrated in Fig. 8, the low voltage battery connections being however maintained throughout such changes.

It will be noted that the connections last described are identical with the connections which were established for the first or lowest speed, as illustrated in Fig. 2, in which the highest resistance was established in the circuit by connecting the field windings in series and introducing the resistance in series therewith in addition. A further movement of the controller to impart to the fingers the position indicated by line V'''—V''', breaks the battery connections, the field winding, armature and resistance connections remaining as just described. This last arrangement of the connections is illustrated in Fig. 9. A further movement of the controller now brings the fingers into the position indicated by line V''''—V'''', in which the battery connections are reëstablished, but instead of being in parallel are now in series, as illustrated in Fig. 10, and are therefore arranged for maximum voltage. A further movement of the controller now brings the fingers into the punctuated position indicated by line VI—VI, the connections of which are illustrated in Fig. 11. At the instant the high voltage connections are made, in the positions above described and intermediate of the 5th and 6th speeds, the circuit is arranged for maximum resistance and the amount of current which is therefore permitted to pass through the circuit is reduced to a minimum, thus also reducing the sparking incident to such change to a minimum. The resistance of the circuit is arranged so that when the connections are made for the 6th speed as described, the reduction in amperage of the current will be substantially in the same proportion as the increase in voltage which takes place as a result of throwing the two batteries into series with each other. The wattage consumption therefore on the 5th speed will be substantially equal to that on the 6th speed. Substantially the same speed is therefore obtained from the 6th position, illustrated in Fig. 10, as is obtained from the 5th, that is after changing from low to high voltage.

The wattage consumption of the apparatus when the controller occupies its 5th position being substantially the same as that of the parts when the controller occupies the 6th position and the speeds resulting from these two changes being substantially the same as above described, it will therefore be seen that by making the change from 5th to 6th positions quickly the momentum of the rotating parts which was obtained on 5th speed will not be caused to decrease before the connections for 6th speed are made and after the 5th speed connections have been broken. This means that there will be practically no current consumed during such transition and that therefore the amount of sparking will be exceedingly small at the instant of breaking the low voltage battery connections and of making the high voltage battery connections. The proper movement for effecting the intermediate positions illustrated in Figs. 7, 8, 9 and 10 is obtained by arranging the mechanical details of the controller so that the travel of the controller between the positions for 5th and 6th speeds is unpunctuated and hence continuous, as will be understood. This may be accomplished by arranging the star wheel without notches between the described 5th and 6th speed positions, as will be readily understood.

The resistance of the field windings is made such as to effect the above result, but to still further reduce even such slight sparking as would be obtained, the resistance is also introduced into the circuit in series as previously described before the low voltage connections are broken and the high voltage battery connections are made. Immediately after the high voltage connections are made, the resistance is cut out and we have the same field-winding and armature connections for the 6th speed as were obtained on the 2d speed. By so cutting out the resistance after effecting the connections described, loss of current due to continued use of resistance is eliminated at the same time making it possible to obtain a gradual increase of speed. A further step of the controller to bring the contact fingers into the position indicated by lines VII—VII, VIII—VIII and IX—IX effects changes in the connections identical with those explained in connection with the 3d, 4th and 5th speeds in so far as concern the field armature and resistance. The connections for these last three positions are illustrated in Figs. 12, 13 and 14. Three additional speeds are thereby obtained.

In the arrangement illustrated, the segments S' S' are arranged to effect reverse connections identical with those made for the 1st, 2d and 3d speeds forward, and the segments and their connections are arranged accordingly as will be readily understood. The segments are so arranged as to accomplish the changes in field connections without breaking the current, by passing the latter during the changes through one part of the field. This is accomplished as heretofore by arranging the intervals between the alined segments as illustrated, wherein certain of such intervals are of a length such that the corresponding fingers may contact two successive segments at the same time. The longer intervals are filled with suitable insulating material as shown, to bring them flush with the segments.

I, therefore, particularly point out and distinctly claim as my invention:—

1. In a system of electrical control for motor vehicles, the combination of a series wound motor, a controller, a divided storage battery, and connections; said controller and connections being arranged so as to introduce the divisions of the battery into the circuit in parallel or in series; and further arranged so as to introduce a resistance in series with the circuit before the parallel battery connections are broken; and to make the series battery connections before such resistance connections are broken.

2. In a system of electrical control for motor vehicles, the combination of a series wound motor, means for producing a low and a high voltage, a controller and connections; said controller arranged to vary such connections so as to produce a high or low resistance circuit including the motor, to change said circuit from low to high voltage, and to change from low resistance circuit to high resistance circuit prior to changing from low to high voltages.

3. In a system of electrical control for motor vehicles, the combination of a series wound motor, means for producing a low and high voltage current for the motor circuit including connections between said motor and current producing means; and means for changing such connections arranged to vary the resistance of the circuit so as to produce varying motor speeds and to change the voltage from low to high; said means further adapted to change the resistance from low to high immediately prior to changing the voltage.

4. In a system of electrical control for motor vehicles, the combination of a series wound motor, means for producing a low and a high voltage in the motor circuit including connections between said motor and current producing means; and means for changing such connections arranged to produce varying speeds on the low voltage, and varying speeds on the high voltage; and further adapted when changing from connections producing the maximum on low voltage, to effect the connections used for
5 low speed just prior to breaking the low voltage connections and maintaining same until the high voltage connections are made.

Signed by me, this 21st day of January, 1908.

EMIL GRUENFELDT.

Attested by—
  WM. M. ROTHENBERG,
  LENA A. DULANE.